(12) United States Patent
Burban et al.

(10) Patent No.: US 6,585,808 B2
(45) Date of Patent: Jul. 1, 2003

(54) MEMBRANE AIR DRYER WITH INTEGRAL DIFFUSER AND METHOD OF MANUFACTURE THEREOF

(75) Inventors: John H. Burban, Lake Elmo, MN (US); Robert O. Crowder, Little Canada, MN (US); Michael R. Spearman, The Woodlands, TX (US); Keith A. Roberts, St. Paul, MN (US)

(73) Assignee: Porous Media Corporation, St. Paul, MN (US)

( * ) Notice: Subject to any disclaimer, the term of this patent is extended or adjusted under 35 U.S.C. 154(b) by 0 days.

(21) Appl. No.: 10/010,373

(22) Filed: Dec. 6, 2001

(65) Prior Publication Data

US 2002/0069758 A1 Jun. 13, 2002

Related U.S. Application Data

(60) Provisional application No. 60/254,407, filed on Dec. 8, 2000.

(51) Int. Cl.[7] .......................... B01D 53/22; B01D 63/02
(52) U.S. Cl. ................... 96/8; 95/52; 96/10; 55/DIG. 5
(58) Field of Search ............................. 95/52; 96/8, 10; 55/DIG. 5

(56) References Cited

U.S. PATENT DOCUMENTS

| | | | | | |
|---|---|---|---|---|---|
| 3,735,558 A | * | 5/1973 | Skarstrom et al. | ............. | 95/52 |
| 4,783,201 A | * | 11/1988 | Rice et al. | ...................... | 95/52 |
| 5,002,590 A | * | 3/1991 | Friesen et al. | .................. | 95/52 |
| 5,067,971 A | * | 11/1991 | Bikson et al. | .................. | 95/52 |
| 5,158,581 A | * | 10/1992 | Coplan | .......................... | 95/52 |
| 5,160,514 A | * | 11/1992 | Newbold et al. | ............ | 96/8 X |
| 5,470,469 A | * | 11/1995 | Eckman | ...................... | 96/8 X |
| 5,525,143 A | * | 6/1996 | Morgan et al. | ................. | 95/52 |
| 6,136,073 A | * | 10/2000 | Coan et al. | ..................... | 96/8 |
| 6,210,464 B1 | * | 4/2001 | Nakanishi et al. | ............. | 95/52 |

FOREIGN PATENT DOCUMENTS

| | | | | | |
|---|---|---|---|---|---|
| JP | 62-038220 A | * | 2/1987 | ...................... | 96/8 |
| JP | 01-034424 A | * | 2/1989 | ...................... | 96/8 |
| JP | 01-199623 A | * | 8/1989 | ...................... | 96/8 |
| JP | 03-086219 A | * | 4/1991 | ...................... | 96/8 |

* cited by examiner

Primary Examiner—Robert H. Spitzer
(74) Attorney, Agent, or Firm—Marshall & Melhorn, LLC

(57) ABSTRACT

A membrane air drier utilizes an orifice to serve as the sweep air inlet with a sweep diffuser placed a short distance from the orifice. Preferably, an open channel extends from the product end of the membrane module on the shell side of the fibers with a porous diffuser at one end of the open channel and an orifice at the other end of the channel.

16 Claims, 6 Drawing Sheets

MEMBRANE AIR DRYER WITH INTEGRAL DIFFUSER AND METHOD OF MANUFACTURE THEREOF

CROSS REFERENCE TO RELATED APPLICATIONS

This application claims the priority of U.S. Provisional Patent application Ser. No. 60/254,407, filed on Dec. 8, 2000, which provisional patent application was pending as of the filing date of this application. U.S. Provisional Patent application Ser. No. 60/254,407 is hereby expressly incorporated by reference, as if set forth in its entirety herein.

BACKGROUND OF THE INVENTION

1. Field of the Invention

The present invention relates generally to the compressed air and gas industry. More particularly, the present invention relates to the use of an apparatus for the removal of water from compressed gas streams and a method of making the device. Most particularly the present invention relates to an improved membrane module for use in such systems and a novel method of manufacture thereof.

2. Discussion of the Related Art

Membrane gas dehydration modules are known in the industry and art as effective means for removing water vapor from compressed gas streams. One of the common gas streams that is dehydrated with membranes is air. Several examples of membrane air dryers can be found in U.S. Pat. No. 4,783,201 by Rice; U.S. Pat. No. 5,002,590 by Friesen; and U.S. Pat. No. 5,067,971 by Bikson.

A common feature of membrane air dryers is that a certain amount of the compressed feed air is lost in the process of dehydration because of its use as the sweep gas. This air is commonly known in the art as the sweep or purge. Several methods exist in the art for achieving and controlling the purge amount. U.S. Pat. No. 4,783,201 specifically controls the air permeability of the fibers so that only a predetermined amount of compressed feed air permeates the membrane. In U.S. Pat. No. 5,160,514 an external valve is used to expand out a portion of the dried product air and reintroduce it into the shell side of a lumen fed hollow fiber module. Additionally, methods exist in the art where the purge air is supplied to the shell side of the fibers via holes or orifices placed internally in the potting compound on the product end of the module. In this case, the sweep air exits the orifice or hole at near sonic velocity into the shell side of the module. It is known in the art that in order to achieve efficient use of the membrane area and the purge air the distribution of the purge air is critical, and optimal performance is achieved if the purge air is uniformly distributed.

The membrane air dryers known in the art generally function by contacting one side of a semi-permeable membrane with a pressurized wet feed stream. The membrane is chosen such that it preferentially allows water to permeate faster than the feed gas that is being dehydrated. A portion of the dried gas known in the art as the sweep is depressurized and contacts the other side of the membrane and acts to drive away the water moisture that has permeated the membrane. While the form of the membrane may be either flat sheet, or hollow fiber, most commercially available membrane air dryers are made with hollow fibers. Additionally, for typical plant installations, where the air pressure does not exceed 200 psig, the feed gas is introduced to the lumen of the fibers, and the sweep air is introduced to the shell of the module and contacts the outer surfaces of the fiber. Typically this sweep air flows generally counter current to the flow of the compressed air stream.

Since it is desirable to have a uniform sweep rate many methods have been developed to control and introduce the sweep air into the module. Specifically, many methods have been developed to control and introduce the sweep air into the module where a hole or orifice located internally in the potting compound of one end of the module (typically the product end for counter current flow) is used to provide sweep air.

While this method of sweep introduction is viable for many applications, it suffers from several drawbacks, especially as the orifice size increases. These drawbacks relate to the jet-like nature of the air flow exiting the orifice or tube, and the possibility of degradation of the fibers in the module. Thus, those skilled in the art continue to search for a satisfactory solution as to how to control and introduce the sweep air into the module, obtain a uniform sweep flow distribution, and at the same time have no fiber degradation.

SUMMARY OF THE INVENTION

The present invention solves the problems present in the related art by replacing internal orifices or needles typically used in hollow fiber modules with an orifice to serve as a sweep inlet, and a sweep diffuser placed a short distance from the orifice. A novel method of manufacturing such a module is also disclosed.

In one embodiment of the present invention a membrane module is provided having an open channel extending from the product end of the membrane module on the shell side of the fibers with a porous diffuser at one end of the open channel, and an orifice at the other end of the channel.

In another embodiment of the present invention, a method of manufacturing a module of the foregoing nature is provided comprising the steps of:

a) inserting a plug into a one ended porous tube, inserting the combination so produced into the end of a bundle of fibers before potting, potting at least one end of the membrane module to fix in place the combination of the plug and porous tube, cutting the end of the potted module for sufficient distance to open up the lumen side of the fibers, removing the plug from the porous tube, and inserting an orifice into the open channel proximate the end of the module.

Thus, it is one of the objects of the present invention to provide an improved method of sweep introduction for a membrane module.

Another object of the present invention is to provide an improved method of introducing sweep gas into the shell side of a membrane module which provides for a more uniform sweep rate.

A further object of the present invention is to provide an improved method of the foregoing nature which eliminates or reduces fiber degradation.

A further object of the present invention is to provide a membrane module wherein less of the shell area of the module is bypassed by the sweep flow.

A still further object of the present invention is to provide an improved membrane module wherein a porous plug and an orifice are used in place of a sweep needle to introduce the sweep gas into the shell side of the module.

Further objects and advantages of the present invention will be apparent from the following description and appended claims, reference being made to the accompanying drawings forming a part of the specification, wherein like reference characters show corresponding parts in the several views.

DESCRIPTION OF THE PREFERRED EMBODIMENTS

Figure 1:
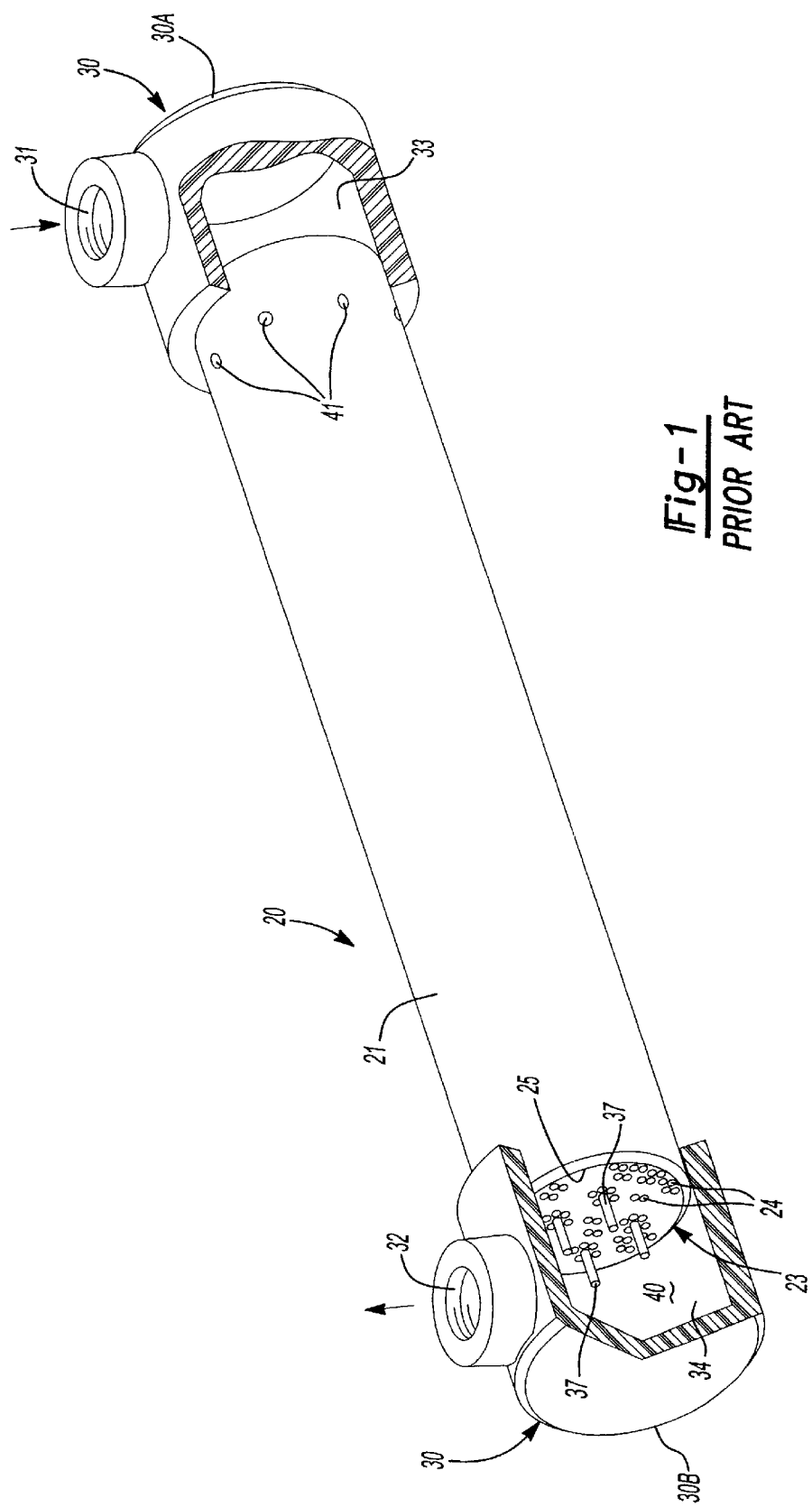
FIG. 1, is a fragmentary perspective view of a known membrane air dryer.

Referring now to FIG. 1, there is shown a known membrane air dryer, generally designated by the numeral 20, which comprises a hollow shell or tube 21. The hollow shell or tube 21 contains a bundle 23 of hollow fibers 24. The hollow fibers 24 are chosen so they preferentially allow water vapor to permeate faster than the feed gas that is being dehydrated. The bundle 23 of hollow fibers 24 is sealed by potting compound 25 at both ends so that the interiors of the hollow fibers 24 in the hollow fiber bundle 23 can not communicate with the exterior of the hollow fibers 24.

Each end of the shell 21 is closed by an end cap 30, both of which may be identical. The upstream or inlet end cap 30A has an inlet 31. The downstream or outlet end cap 30B has an outlet 32. End caps 30 are affixed to the shell 21 by means well known in the art so as to create an inlet plenum 33 and an outlet plenum 34. Inlet 31 is in fluid communication with inlet plenum 33, and outlet 32 is in fluid communication with outlet plenum 34. A sweep inlet 40 is provided by a plurality of small hollow tubes 37 which are potted into the outlet end of the bundle 23 of hollow fibers 24, and provide fluid communication between the outlet plenum 34 and the outside or shell side of the hollow fibers 24. The small hollow tubes 37 comprising the sweep inlet 40 pass through the potting compound 25 at the outlet end of the bundle 23 for a short distance to insure fluid communication.

It can be seen that when the membrane air dryer 20 is pressurized and in operation, since the exterior of the fibers 24 comprising the hollow fiber bundle 23 are in fluid communication with the atmosphere through a plurality of parametrically spaced holes 41 in the shell 21, the pressure difference between outlet plenum 34 and the atmosphere will cause a continuous flow of air from the outlet plenum 34, through the sweep inlet tubes 37, and out the sweep outlet 41, thereby removing any water vapor which has permeated through the wall of the hollow fibers making up the hollow fiber bundle 23, and providing dehydrated air or gas through the outlet 32.

Figure 2:
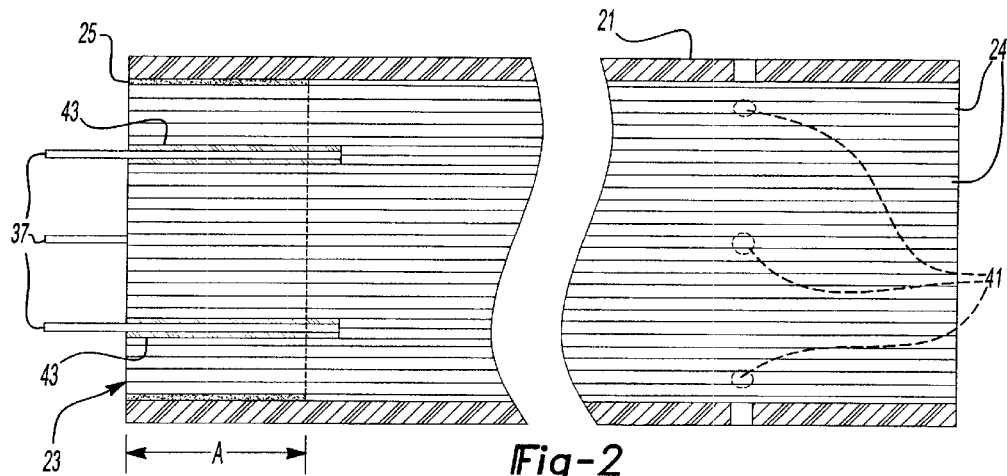
FIG. 2, is an elevational sectional view of the membrane module and hollow shell or tube of the construction shown in FIG. 1.

The hollow shell or tube 21, and the bundle 23 of hollow fibers, are shown on an enlarged scale in FIG. 2. The hollow tube or shell 21 surrounds, and may be coextensive with, the hollow fiber bundle 23 made with a plurality of hollow fibers 24. Potting compound 25 is used at each end of the hollow fiber bundle 23 to seal the ends of the bundle for a predetermined distance A, and to prevent any fluid communication between the interior, or lumen surfaces, of the hollow fiber 23 and the exterior, or shell side, of the fiber. At the outlet end of the hollow fiber bundle 23, a selected plurality of short hollow tubes 43 are potted into the potting compound 25. Short hollow tubes 43 may be substantially even with the outlet end of the hollow fiber bundle 23, and extend a short distance past the other end of the potting compound 25 to provide fluid communication with the outside surfaces of the hollow fibers 24.

Figure 3:
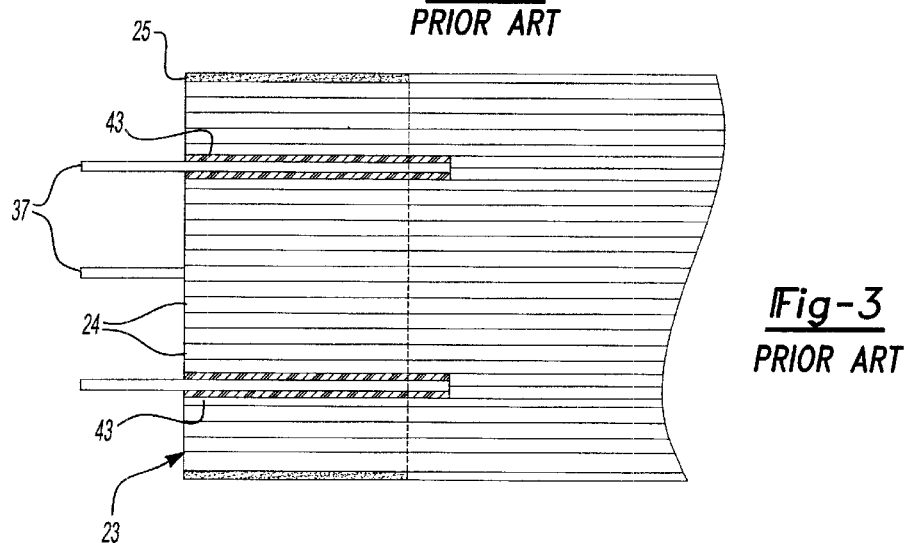
FIG. 3, is a fragmentary elevational view of the membrane module shown in FIG. 2.

FIG. 3 shows a fragmentary view of the construction shown in FIG. 2 with the hollow tube or shell 21 removed.

Figure 4:
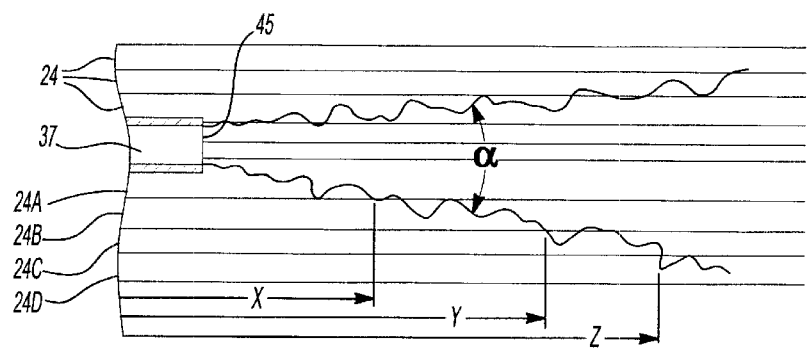
FIG. 4, is a diagrammatic view showing the diffusion of flow from one of the needles shown in the construction of FIG. 3.

Referring now to FIG. 4, there is shown what is believed by those skilled in the art to be a representation of the flow out the end of one of the small tubes 37 shown in FIG. 3. The small tube 37 will act as an orifice, and the velocity exiting from the orifice will be a sonic velocity when the absolute pressure downstream divided by the absolute pressure upstream is less than or equal to 0.528. In other words $P_2/P_1 \leq 0.528$. As the pressure upstream increases there is no further increase in the velocity of the air flowing through the orifice 45, although the mass flow rate increases due to higher air density. The density of the air is proportional to upstream pressure.

As mentioned above it has been found that this sonic flow tends to degrade the fibers nearest the orifice 45, causing loss of efficiency and sometimes module failure. More information on turbulent jet theory can be found at pages 5–22 and 5–23 of Perry's Chemical Engineering Handbook Sixth Edition, McGraw-Hill, 1984. The other consideration which becomes relevant is the diffusion of the sonic flow once it leaves the orifice 45. The angle of diffusion alpha ( ) is shown based on modeling according to turbulent free jet theory. Although the presence of the hollow fibers can alter the behavior of the jet, the general characteristics of a turbulent jet still apply. Turbulent jet theory teaches that the spreading angle ( ) of a jet can be shallow. The theory also states that as the difference between the pressure of the expanding air and the surrounding air (in the case of a module, the product compressed air pressure and the shell pressure) increases, the angle becomes more shallow.

The net result of a shallow spreading angle is that a significant amount of active fiber surface area can be bypassed by the sweep flow. In addition, when the turbulent free jet impinges upon the fiber outer diameter, energy is transferred from the air stream to the fiber surface. As mentioned above, this energy transfer can cause fiber degradation, eventually leading to a condition where the fiber integrity is compromised. The likelihood of sweep air bypassing the fiber surface area and fiber degradation increases rapidly as the orifice size increases. Thus, while the use of the orifice is viable, and results in satisfactorily operating modules when the orifice is very small, the above-mentioned conditions will result in a less than optimal condition when the orifice size increases. It should also be noted that the use of multiple small orifices, instead of a single, larger, orifice, may be impractical, and may still lead to fiber degradation.

As shown in FIG. 4, hollow fiber 24A is bypassed by the flow through the orifice 45 for distance X. Hollow fiber 24B is bypassed by the flow from the orifice 45 for a distance Y, which is greater than X, and fiber 24C is bypassed by the flow from the orifice for a distance Z, which is greater than distance Y. When this bypass is taken into account for all the fibers in the bundle 23, a significant amount of surface area can be seen to be bypassed.

Figure 5:
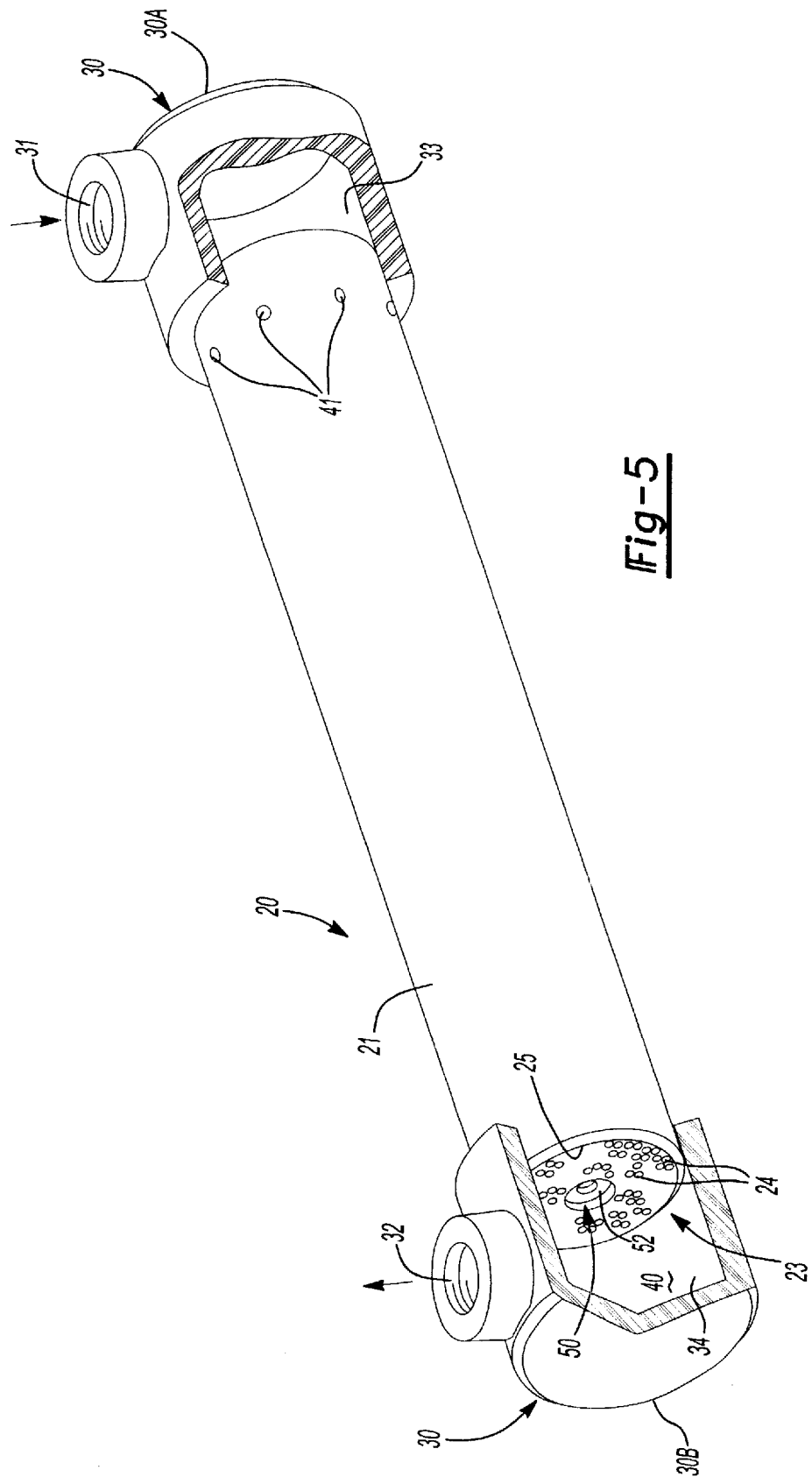
FIG. 5, is a fragmentary perspective view of a membrane air drier in accordance with one embodiment of the present invention.

FIG. 5 is similar to the fragmentary perspective view of the membrane air drier shown in FIG. 1, utilizing the improved hollow fiber bundle of the present invention. The construction of the hollow fiber bundle, used in this embodiment of the present invention, will be discussed hereinbelow.

Referring to FIG. 5, the present invention overcomes the above-mentioned deficiencies of the prior art by incorporating a diffusing element integral to the module. This diffusing element is positioned such that the jet of the air that exits the orifice travels through the diffuser before it enters the shell side of the module. Suitable diffusers for this invention include, but are not limited to, porous metals, porous ceramics and porous plastics.

The diffusers can also be used to control the sweep rate instead of the orifice. The diffuser can be mechanically locked into place by potting compound, glued into place, or press fit into place. Ideally the diffusers will have uniform pore sizes and uniform permeability. Also it will be obvious to those skilled in the art that the exact placement of the diffuser and the potting compound and its degree of protrusion into the shell side of the module will be a function of the module's physical and operational parameters and the diffuser's physical characteristics.

Figure 6:
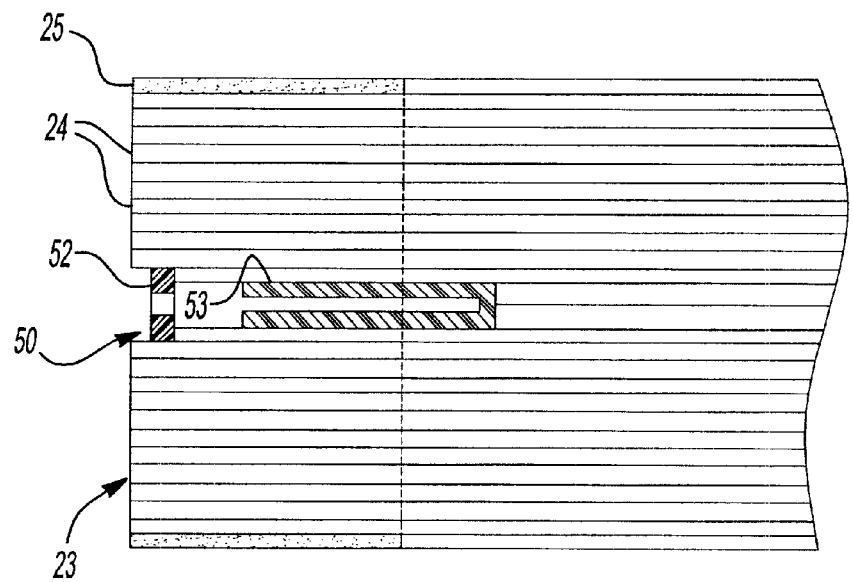
FIG. 6, is a fragmentary elevational view of a membrane module embodying the construction of the present invention.
Figure 6A:
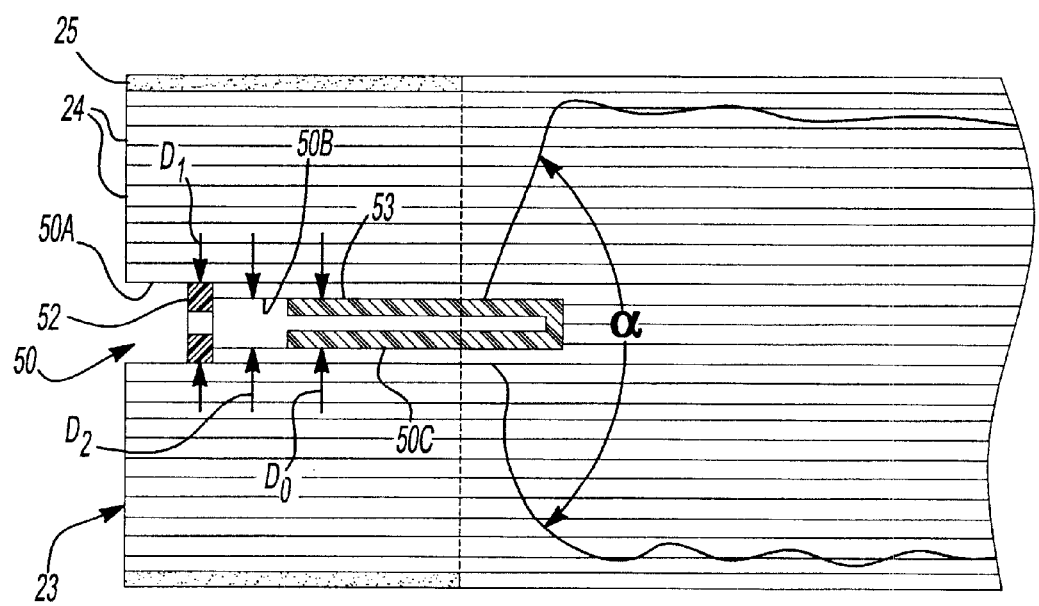
FIG. 6A, is a diagrammatic view showing the diffusion of flow downstream of the orifice shown in FIG. 6.

The optimum diffuser and its positioning will be module specific. However, the concept behind the invention applies independently of module size or operating parameters. For situations where the module diameter is large, multiple diffusers can be used to give optimum shell side flow distribution. In the preferred embodiment shown in FIG. 5, the short hollow fibers 43 and small tubes 37 are replaced by one or more open channels 50 formed during the manufacturing process between the hollow fibers 24. The open channels 50 may be of single or multiple diameters. In each channel 50 is an orifice 52, and a porous tube 53 with an outer diameter $D_0$. The change in flow distribution which this produces is shown in FIG. 6A. It can be seen that the jet angle ($\alpha$) is much larger, thus resulting in increased efficiency. Also the velocity through the diffuser is much lower, therefore largely, or completely, eliminating the problem of fiber degradation.

Figure 7:
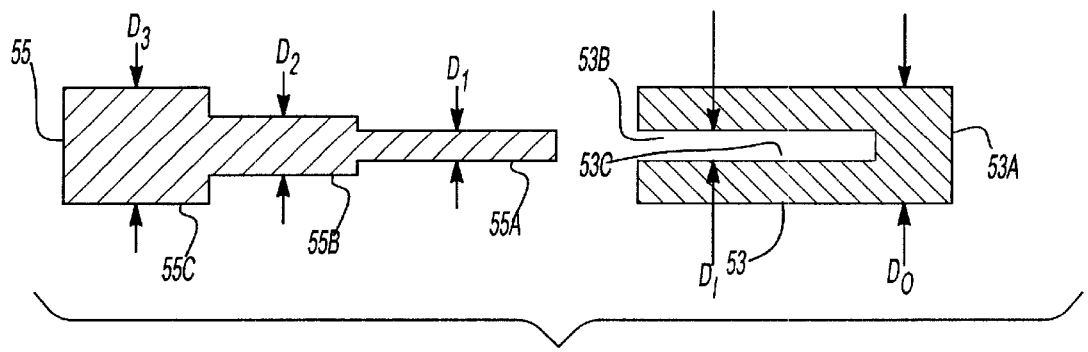
FIG. 7, is a diagrammatic view of the plug and tube used to manufacture the construction shown in FIG. 6.

With reference to FIGS. 7–11, there is shown a novel method of providing the open channel 50 and inserting the diffuser comprising orifice 52 and porous tube 53. As shown in FIG. 7, a plug 55 is first inserted into a porous tube 53 by means well known in the art. The plug 55 is made of a material which does not bond well to the potting compound, while the porous tube 53 may. By "porous tube" is meant a hollow porous cylinder or tube having one end closed and the other end open. As illustrated in FIG. 7, first end 53A of porous tube 53 is closed, while second end 53B is open. The porous tube 53 has an inner diameter $D_1$ and an outer diameter $D_0$.

Preferably, plug 55 has multiple diameters $D_1$, $D_2$, and $D_3$. Depending on the particular application, the plug 55 may be all of the same diameter, have three diameters as illustrated, or have less than three or more than three diameters. In the preferred embodiment illustrated, plug 55 has a first portion 55A of a first diameter ($D_1$) a second potion 55B of a second diameter ($D_2$) and a third portion 55C of a third diameter ($D_3$). Diameter $D_3$ is preferably the same diameter as the first portion 50A (see FIG. 6A) of open channel 50. The diameter of second portion 55B of plug 55 has a diameter $D_2$ which is substantially equal to the diameter of the second portion of the open channel 50B, and the diameter of the third portion 55A of plug 55 is of a diameter ($D_1$) slightly larger than the inside diameter ($D_1$) of the porous tube 53 such that first portion 55A of plug 55 will be a press fit into the end 53B of porous tube 53. The length of first portion of 55A of plug 55 may be equal to, or less than, the length of passageway 53C formed in the tube 53.

Figure 8:
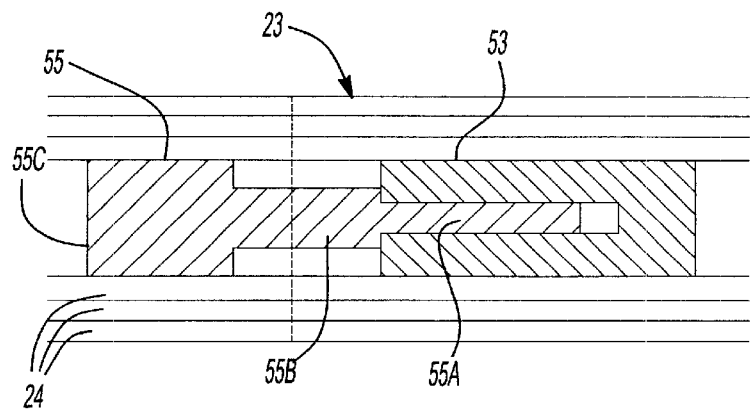
FIG. 8, is a partial elevational view showing the construction of FIG. 7 in place during the manufacturing process.

The porous tube 53 is sized such that the open end of the porous tube pots in the potting compound during the potting step to be described hereinafter. The material of the porous tube 53 includes, but is not limited to, porous metal, porous ceramics, and porous plastic. A porous plastic tube suitable for use in the present invention is such as the Porex X-6810 or X-6865 available from Porex Corporation of Fairburn, Ga. 30213. Once the plug 55 is press fit into the porous tube 53, the plug/tube combination is inserted into the product end of the bundle 23 before potting as shown in FIG. 8. The product end of the bundle 23 is, in this embodiment, the outlet end of the bundle 23.

Figure 9:
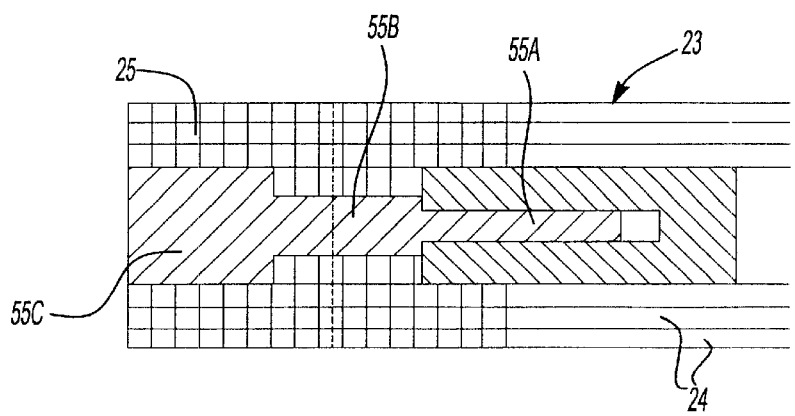
FIG. 9, is an elevational view showing the construction of FIG. 8 after potting but before trimming.

Potting compound is then applied to the bundle 23 by centrifugal potting, or any of the other well known methods of potting known in the art, to produce the construction in FIG. 9. The potting may be coextensive with the third portion of 55C of the plug 55, and bonds the plug/tube combination (55, 53) in place between the fibers 24 of the fiber bundle 23.

Figure 10:
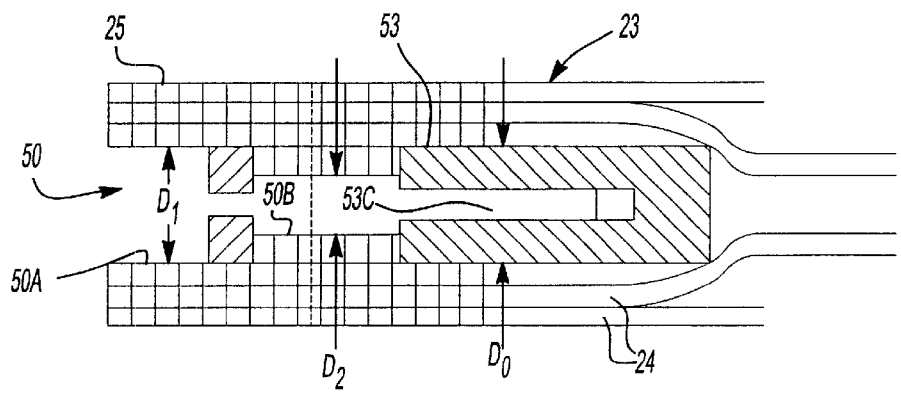
FIG. 10, is a partial elevational view showing the construction of FIG. 9 after cutting and plug removal.

Referring now to FIG. 10 the end of the potted bundle of fibers is cut back a predetermined distance, usually one half inch or less, to open the ends of the fibers 24. This results in the cutting off of a part of the third portion 55C of the plug 55. The remaining portion of the plug 55 may be easily removed by means well known in the art, leaving the previously described open channel 50 in the fiber bundle 23. The diffuser 53, since it may be made of a material which adheres to the potting compound 25, is held in place between the fibers 24. As illustrated, immediately adjacent the porous tube 53 fibers 24 have been slightly displaced.

Figure 11:
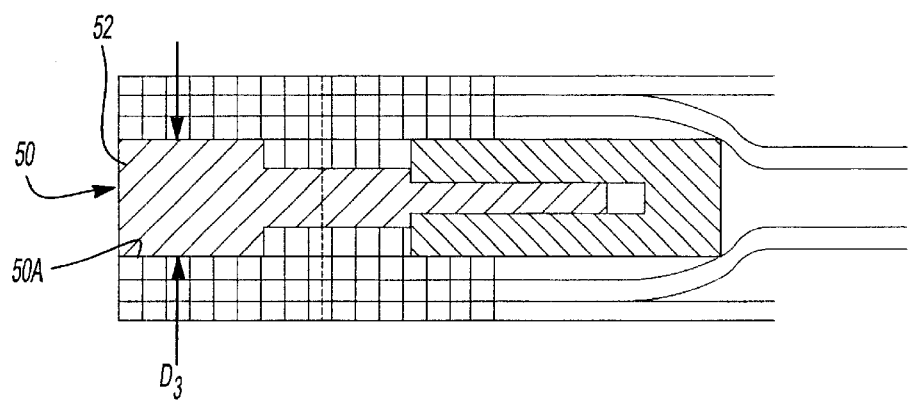
FIG. 11, is an elevational view showing the construction of FIG. 10 after orifice insertion.

As mentioned hereinabove, the diameter ($D_3$) of the third portion 55C of plug 55 was chosen to be of a diameter substantially equal to the diameter of the first portion 50A of the open channel 52, and this diameter was chosen such that a commercially available orifice, such as the O'Keefe Controls Co. of Monroe, Conn. 06468, type IA, may be press fit into the first portion 50A of the open channel 50, as shown in FIG. 11.

Figure 12:
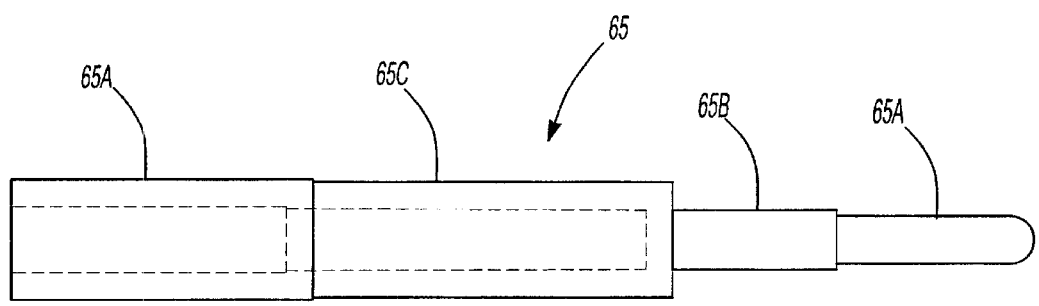
FIG. 12, is an elevational view similar in part to FIG. 7 but showing a four stage plug.

A modified plug now identified by the numeral 65, is shown in FIG. 12. Sometimes it is desirable to use a commercially available porous tube 53 having two different internal diameters interiorly of the tube. For example, instead of a single diameter passageway 53 (FIG. 6) a passageway having two different diameters may be provided for example 65A and 65B. In this case the first portion 65A and the second portion 65B of the modified plug 65 would fit in the tube 53, with the third portion 65C and the fourth portion 65D corresponding to the second portion 55B and the third portion 55C of the plug 55 shown in FIG. 6. The diameter of the fourth portion 65D would be substantially the same as the diameter ($D_3$) of the first portion 50A of the open channel 50 and the diameter 65C of the modified plug 65 would be the same as the diameter ($D_2$) of the second portion 50B of the open channel 50. The size, length, and shape of the plug 55 or the modified plug 65 may vary widely and still be within the scope of the present invention.

Thus by carefully studying the problems existing in present day membrane air dryers a novel membrane air dryer and method and manufacture have been developed.

What is claimed is:

1. A membrane air drier comprising;
    a) a shell,
    b) a bundle of hollow fibers sealingly mounted within said shell so that the interior of said hollow fibers is blocked from fluid communication with the exterior of said hollow fibers,
    c) a first endcap sealingly mounted at one end of said shell to provide a first plenum adjacent a first end of said bundle of hollow fibers, said first endcap having an inlet in fluid communication with said first plenum,
    d) a second endcap sealingly mounted at one end of said shell to provide a second plenum adjacent a second end of said bundle of hollow fibers, said second endcap having an outlet in fluid communication with said second plenum,
    e) at least one open channel extending from said bundle of hollow fibers;
        wherein each of said at least one open channels comprises a diffuser, and each diffuser comprises an orifice and a porous tube.

2. The membrane air drier according to claim 1, where said at least one open channel comprises a plurality of open channels.

3. The membrane air drier according to claim 2, wherein each of said plurality of open channels has the same diameter.

4. The membrane air drier according to claim 2, wherein said plurality of open channels have different diameters.

5. The membrane air drier according to claim 1, further comprising:
    a sweep outlet in fluid communication with the exterior of said bundle of hollow fibers,
    a sweep inlet in fluid communication with the exterior of said bundle of hollow fibers.

6. The membrane air drier according to claim 5, wherein said sweep outlet is adjacent said first endcap, and said sweep inlet is adjacent said second endcap.

7. A fiber bundle for a membrane air dryer comprising:
    a bundle of hollow fibers sealed at each end, so that the interior of said hollow fibers is blocked from fluid communication with the exterior of said hollow fibers, and
    at least one channel extending from an end of said bundle of hollow fibers, each of said at least one channels comprising a diffuser, each diffuser comprising an orifice and a porous tube.

8. A method of manufacturing a membrane module having fibers which have a shell side, the membrane module having an open channel extending from a product end of the membrane module on the shell side of the fibers with a porous diffuser at one end of the open channel, and an orifice at the other end of the channel comprising the steps of:
    inserting a plug into a one ended porous tube;
    inserting the combination so produced into the end of a bundle of fibers before potting;
    potting at least one end of the membrane module to fix in place the combination of the plug and porous tube;
    cutting the at least one end of the potted module for sufficient distance to open up the lumen side of the fibers;
    removing the plug from the porous tube; and
    inserting an orifice into the open channel proximate the end of the module.

9. The method according to claim 8, wherein the plug is made of a material that does not bond well to the potting compound used to pot the at least one end of the membrane module.

10. The method according to claim 8, wherein said one ended porous tube is a hollow cylinder.

11. The method according to claim 8, wherein the plug has first, second and third sections, each of said first second and third sections having a different diameter.

12. The method according to claim 11, wherein the open channel comprises a first portion having substantially the same diameter as the first section of the plug, and the open channel comprises a second section having a diameter substantially equal to the diameter of the second section of the plug.

13. The method according to claim 12, wherein the porous tube has a diameter, and the third section of the plug has a diameter slightly greater than the diameter of the porous tube.

14. The method according to claim 8, wherein the porous tube comprises one of: porous metal, porous plastic and porous ceramic.

15. The method according to claim 8, wherein the step of inserting a plug into a one ended porous tube comprises press fitting the plug into the porous tube.

16. The method according to claim 8, wherein the porous tube has first and second sections with different internal diameters.

* * * * *